United States Patent [19]
Dubois

[11] Patent Number: 6,129,327
[45] Date of Patent: Oct. 10, 2000

[54] CAPTIVE SOFT FOAM SHOCK BASE MOUNT

[75] Inventor: Neil J. Dubois, Cranston, R.I.

[73] Assignee: The United States of America as representd by the Secretary of the Navy, Washington, D.C.

[21] Appl. No.: 09/090,326

[22] Filed: May 22, 1998

[51] Int. Cl.[7] .................................................. F16M 13/00
[52] U.S. Cl. ........................ 248/634; 248/638; 248/678
[58] Field of Search .................................. 248/634, 633, 248/632, 638, 678, 676, 560, 581, 621, 619, 618

[56] References Cited

U.S. PATENT DOCUMENTS 5,308,675   5/1994   Crane et al. ......................... 248/638 X
5,456,438  10/1995   Long .................................... 248/638 X

*Primary Examiner*—Ramon O. Ramirez
*Attorney, Agent, or Firm*—Michael J. McGowan; James M. Kasischke; Prithvi C. Lall

[57] ABSTRACT

A shock absorbing device includes a base portion interconnected with a top portion and layered with a shock absorbing material. The base portion includes a base mount bracket having a planar support member and upstanding integral bottom mounting plates oriented in a perpendicular relationship with respect to the planar support member, and a planar interconnecting plate member removably connected to the upstanding bottom mounting plates of the base mount bracket. The top portion includes a planar top plate, and a U-shaped interconnecting plate removably connected to the planar top plate. A plurality of layers of shock absorption material are provided such that a first one of the plurality of layers is positioned between the base mount bracket and the U-shaped interconnecting plate, a second one of the plurality of layers is positioned between the U-shaped interconnecting plate and the planar interconnecting plate, and a third one of the plurality of layers is positioned between the planar interconnecting plate and the top mounting plate.

10 Claims, 2 Drawing Sheets

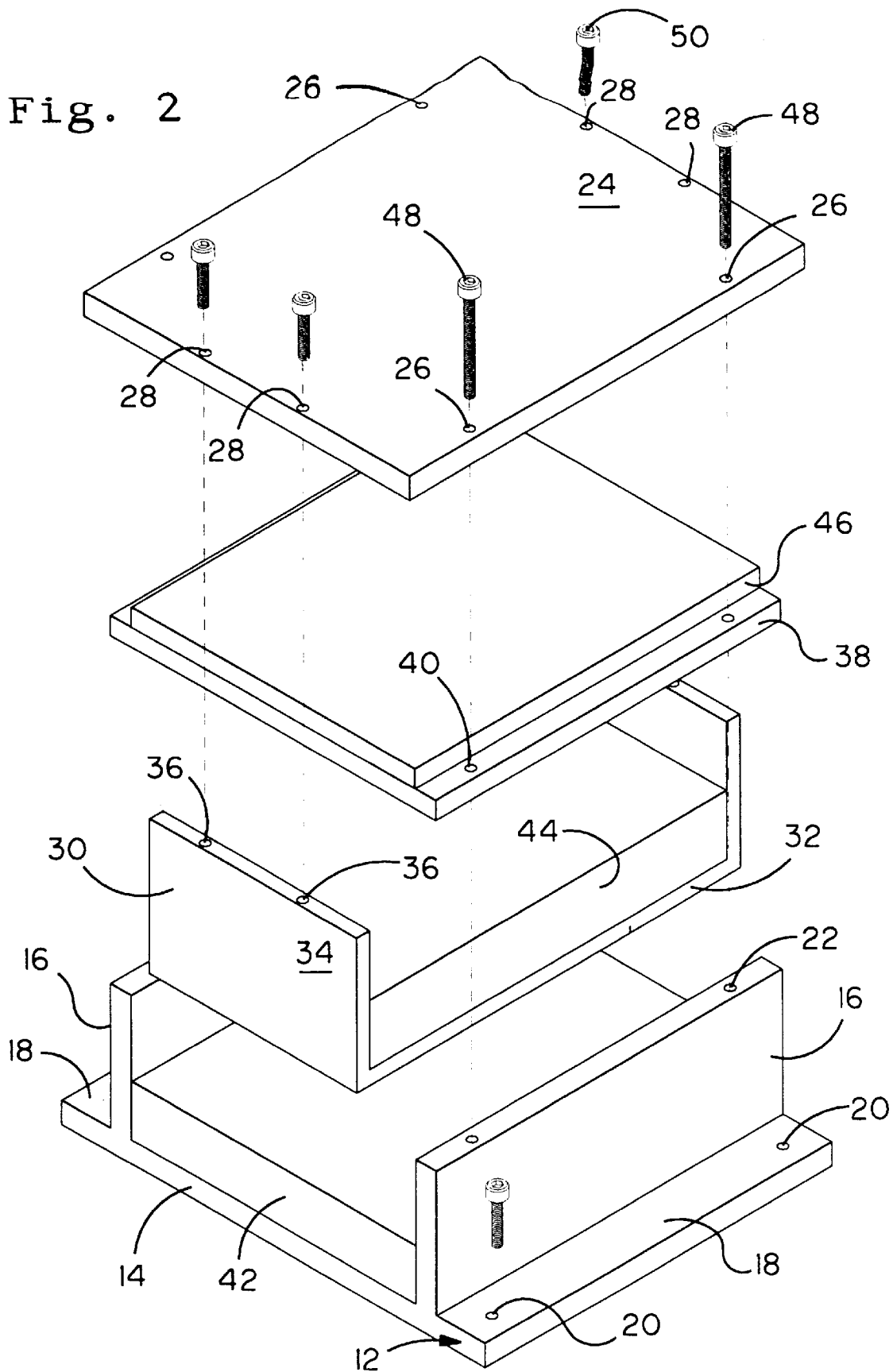

CAPTIVE SOFT FOAM SHOCK BASE MOUNT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a shock absorbing device. More particularly, the invention relates to a shock absorbing device in which captivated soft foam is layered between interlocking structural supports.

(2) Description of the Prior Art

Earlier methods for shock absorption were time consuming to assemble and difficult to engage.

The following patents, for example, disclose isolation and shock absorption devices, but do not disclose captivated soft foam layered between interlocking structural supports.

U.S. Pat. No. 4,713,714 to Gatti et al.
U.S. Pat. No. 5,054,251 to Kemeny
U.S. Pat. No. 5,197,707 to Kohan
U.S. Pat. No. 5,215,382 to Kemeny Specifically, the patent to Gatti et al disclose a base shock mount in which first and second brackets 10 and 20 are isolated from one another by vibration isolators 50. Bracket 10 attaches to a foundation and bracket 20 attaches to a component 1. The brackets are similarly shaped to nest in one another but do not interlock.

The patent to Kemeny '251 discloses a base shock mount in which first and second brackets 16 and 20 are isolated from one another by an elastomer layer 28. Bracket 16 attaches to a foundation and bracket 20 attaches to a column 12. The brackets are correspondingly shaped to mesh but do not interlock over plural layers.

Kohan discloses a vibration isolation platform in which a vibration absorption medium is interposed between all opposing faces of plinth 102 and base 106 although the plinth and base are not interlocked.

Kemeny '382 discloses an isolation bearing in which rigid brackets are simply isolated from one another with an elastomer that includes polyurethane.

It should be understood that the present invention would in fact enhance the functionality of the above patents by increasing the shock absorption capabilities with a simplified and structurally sound device.

SUMMARY OF THE INVENTION

Therefore it is an object of this invention to provide a shock absorbing device which includes interlocking components.

Another object of this invention is to provide a shock absorbing device in which interlocking components are separated by soft shock absorbing foam.

Still another object of this invention is to provide a shock absorbing device which can absorb a high impact or load by absorbing shock within at least one of a plurality of captivated soft foam members.

A still further object of the invention is to provide a shock absorbing device which will withstand repeated use and still maintain its strength and flexibility.

Yet another object of this invention is to provide a shock absorbing device which is simple to manufacture and easy to use.

In accordance with one aspect of this invention, there is provided a shock absorbing device including a base portion and a top portion, the base portion being interlocked with the top portion and having layers of a shock absorbing material interposed therein. The base portion includes a base mount bracket having a planar support member and upstanding integral bottom mounting plates oriented in a perpendicular relationship with respect to the planar support member, and a planar interconnecting plate member removably connected to the upstanding bottom mounting plates of the base mount bracket. The top portion includes a planar top plate, and a U-shaped interconnecting plate removably connected to the planar top plate. A plurality of layers of shock absorbing material are provided such that a first one of the plurality of layers is positioned between the base mount bracket and the U-shaped interconnecting plate, a second one of the plurality of layers is positioned between the U-shaped interconnecting plate and the planar interconnecting plate, and a third one of the plurality of layers is positioned between the planar interconnecting plate and the top mounting plate. A load applied to the shock absorbing device will be absorbed by at least one of the layers of shock absorbing material.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 2 is an exploded perspective view of the invention shown in FIG. 1.

DESCRIPTION OF THE PREFERRED EMBODIMENT

Figure 1:
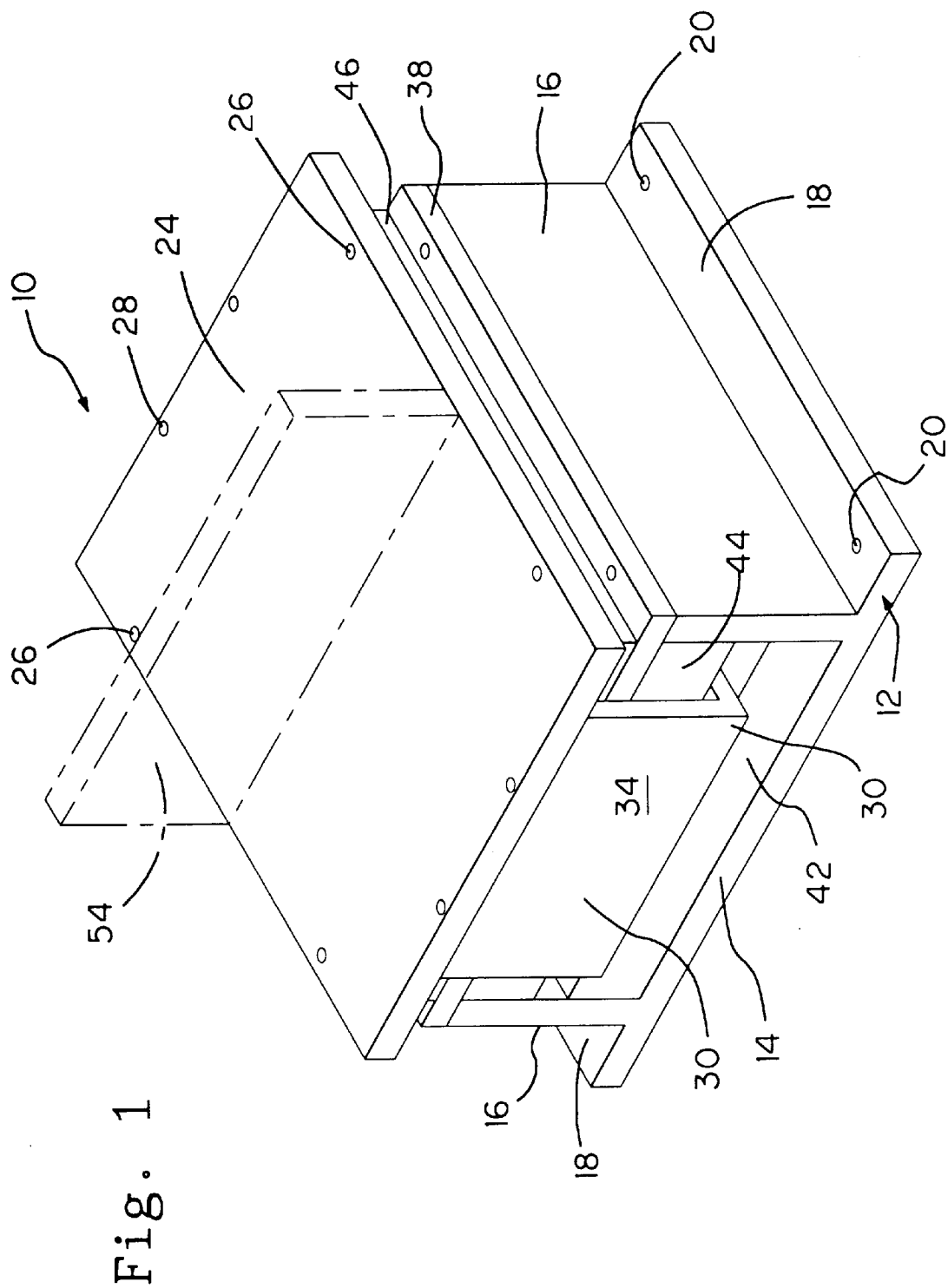
FIG. 1 is a front perspective view of the present invention.

In general, the present invention is directed to a shock mount base for mounting components inside underwater vehicles such as torpedoes. The invention specifically utilizes a soft foam as an isolating layer interposed between interlocked structural elements of the device.

The individual components are primarily shown in FIGS. 1 and 2. In particular, the shock absorbing device is shown as element 10 and includes several interlocking structural elements. A base mount bracket 12 serves as one of the structural elements of the shock absorbing device 10 and includes a planar base plate 14 and a pair of bottom mounting plates 16 extending perpendicularly from a corresponding face of the planar base plate 14. The pair of bottom mounting plates 16 are set in from opposing edges of the planar base plate 14 by a predetermined distance, thereby forming base plate extensions 18 beyond an outer face of each of the bottom mounting plates 16. There are at least two apertures 20 formed in each of the base plate extensions 18. The at least two apertures 20 are used for receiving bolts 48 or the like therein for securing the base mount bracket 12 to an external device (not shown). In addition, there are at least two apertures 22 formed in minor exposed edges of the bottom mounting plates 16 for connection to a planar interconnecting plate 38 which will be described below.

The bottom mounting plates 16 as described, are integral with the planar base plate 14 and can either be as a one-piece construction or separately formed and connected together in a manner suitable to the end use of the device. In other words, a factor in determining the assembly of the planar base plate 14 with the bottom mounting plates 16 will include the end use of the shock absorbing device and the force of the load to be applied thereto.

A top mounting plate 24 opposes the base mount bracket 12 and is planar in appearance. Specifically, the top mounting plate 24 includes a first plurality of apertures 26 for receiving bolts 48 or the like therein for securing the top mounting plate 24 to an external device (not shown). A second plurality of apertures 28 are provided in the top mounting plate 24 for securing the top mounting plate 24 to interconnecting plates as will be further described below. Bolts 50 or the like will be used for the securing of components together.

As more clearly shown in FIG. 2, there are two intermediate or interconnecting mounting plates utilized in the shock absorbing device 10. In particular, a U-shaped interconnecting plate 30 includes a base portion 32 and side walls 34 projecting in a perpendicular orientation from a corresponding face of the base portion 32 at opposing ends thereof, thereby forming the U-shaped interconnecting plate 30. A pair of apertures 36 are formed in each of the minor exposed edges of the side walls 34. The pair of apertures 36 in each side wall 34 are aligned with the apertures 28 in the planar top mounting plate 24 as shown in FIG. 2.

Another intermediate mounting plate is shown as planar interconnecting plate 38. The planar interconnecting plate 38 includes at least pair of apertures 40 formed in opposing ends thereof and adjacent the edge of the planar interconnecting plate 38. Upon assembly, the apertures 22 of the bottom mounting plates 16 will be aligned with the apertures 40 of the planar interconnecting plate 38. Likewise, the apertures 36 of the side walls 34 of the U-shaped interconnecting plate 30 are aligned with the apertures 28 of the top mounting plate 24.

At least three layers of soft foam are interposed between the mounting plates as follows and consequently "captured" therein as a result of the interlocking nature of the plates. A first foam layer 42 is seated in an area between the bottom mounting plates 16 of the base mount bracket 12. A second foam layer 44 is seated in an area between the side walls 34 of the U-shaped interconnecting plate 30. A third foam layer 46 is seated on the surface of the planar interconnecting plate 38 as shown but does not extend over an entire surface of the planar interconnecting plate 38. The third foam layer 46 is of a size to allow the apertures 40 of the planar interconnecting plate 38 to remain exposed for connection purposes.

Upon assembly, the layers of the shock absorbing device 10 are as follows. The base mount bracket 12 including the first foam layer 42 therein receives the U-shaped interconnecting plate 30 thereon so that a base of the U-shaped interconnecting plate 30 is positioned between the first foam layer 42 and the second foam layer 44. Next, the planar interconnecting plate 38 having the third foam layer 46 thereon is positioned between the second foam layer 44 on the U-shaped interconnecting plate 30 and the third foam layer 46. Finally, the top mounting plate 24 is positioned above the third foam layer 46 seated on the planar interconnecting plate 38. With the side walls 34 of the U-shaped interconnecting plate turned at 90 degrees to the bottom mounting plates 16 of the base mount bracket 12, the ends of the planar interconnecting plate 38 are aligned with the apertures 22 of the bottom mounting plates 16, and the apertures 28 of the top mounting plate 24 are aligned with the apertures 36 in the side walls 34 of the U-shaped bracket 30. This interconnection in combination with the foam layers provides an interlocking arrangement of structural plates having soft foam shock absorbing material interposed therebetween.

Stated another way, the assembly will be such that a base portion of the shock mount device 10 includes the base mount bracket 12 secured to the planar interconnecting plate 38, while an upper portion of the shock mount device 10 includes the U-shaped interconnecting bracket 30 secured to the top mounting plate 24. Once assembled, the brackets 12 and 24 cannot be separated from each other due to a mechanical interference or load applied to the shock absorbing device 10. Between the brackets 12 and 24, are the layers 42, 44, and 46 of soft foam. In the preferred embodiment, these layers of foam are a microcellular urethane foam such as PORON, presently manufactured by the Rogers Corporation. Such a foam possesses excellent damping properties as well as excellent proven shock absorption qualities. By including the soft foam between the interlocked plates of brackets 12 and 24, the foam becomes "captive". During a shock load in a direction perpendicular to the base mount bracket 12 and the top mounting plate 24, the brackets would move in opposition to each other. This motion would be opposed by compression in one of the soft foam layers, the layer alternating with the direction of cyclic motion. Thus, throughout the deflection encountered during the shock event, at least one layer of foam is in compression. These soft foams when used in large compression areas can support great loads.

By the use of soft foam material in compression through the loading cycle, shock absorption is maximized while still maintaining deflection limits. The interconnecting plate design limits the deflection attainable to the thickness of the foam layers. The interconnecting plate design also provides a failsafe mechanism. The mechanical interference eliminates the possibility of a failure in the absorption material allowing the mounting component to fly off.

It is intended that the material used for the brackets and plates is made of aluminum, however the brackets could be made of other materials if the loading required greater or lesser strength. Likewise, material substitutions specific to the environmental conditions can be easily accomplished, for example using a silicone foam material in the case of low temperature operation.

The illustration of FIG. 1 shows the shock absorbing device 10 placed in a particular environment. A shock sensitive component 54, is shown in phantom seated on the shock absorbing device 10. Under impact to the mounting surface, the shock absorbing device 10 will absorb the shock of the impact, thereby protecting the component 54 seated thereon or fixed thereto from damage, and ensuring its reliable operation. Thus, in this example, underwater vehicles such as torpedoes have to withstand severe shock-load environments. Internal components such as electrical equipment are particularly susceptible. To ensure their survivability, mounts must be designed to isolate the component from the shock loads encountered by the vehicle.

By the present invention, shock absorption is conducted in a more efficient manner than previously achieved in the art, and components can withstand greater impact loads as a result of the shock absorption capabilities of the device.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A shock absorbing device comprising:

a base mount bracket having a planar support member and upstanding bottom mounting plates integrally mounted in a perpendicular orientation to the planar support member;

a planar interconnecting plate removably connected to the upstanding bottom mounting plates of said base mount bracket;

a planar top plate;

a U-shaped interconnecting plate having side walls, said U-shaped interconnecting plate being removably connected to the planar top plate;

a first layer of shock absorption material positioned between the base mount bracket and the U-shaped interconnecting plate;

a second layer of shock absorption material positioned between the U-shaped interconnecting plate and the planar interconnecting plate; and a third layer of shock absorption material positioned between the planar interconnecting plate and the planar top plate.

2. The device according to claim 1 further comprising:

a first connection means connecting the bottom mounting plates to the planar interconnecting plate; and a second connection means connecting the planar top plate to the U-shaped interconnecting plate.

3. The device according to claim 2 wherein said first connection means for connecting includes apertures formed in minor exposed edges of the bottom mounting plates and the side walls of the U-shaped interconnecting plate, and wherein said second connection means for connecting includes apertures formed in adjacent corresponding edges of the planar interconnecting plate and said planar top plate.

4. The device according to claim 3 further including at least one connector insertable into aligned apertures for securing said base mounting bracket to the planar interconnecting plate and said planar top plate to the U-shaped interconnecting plate.

5. The device according to claim 1 wherein the side walls of the U-shaped interconnecting plate are oriented at 90 degrees with respect to the bottom mounting plates of said base mount bracket.

6. The device according to claim 1 wherein the bottom mounting plates are formed in a one-piece construction with the planar support member of said base mount bracket.

7. The device according to claim 1 wherein the bottom mounting plates are set in from edges of the planar base plate of said base mounting bracket, thereby forming connector extensions on said base mount plate.

8. The device according to claim 7 wherein said connector extensions include at least a pair of apertures formed therein for connecting said shock absorbing device to an external structure.

9. The device according to claim 1 wherein said planar top plate includes at least a pair of apertures formed adjacent opposing edges thereof for connecting a planar top plate side of said shock absorbing device to an external structure.

10. The device according to claim 1 wherein a load applied to said shock absorbing device will be absorbed by at least one of the plurality of layers of shock absorption material.

* * * * *